Figure 1A:
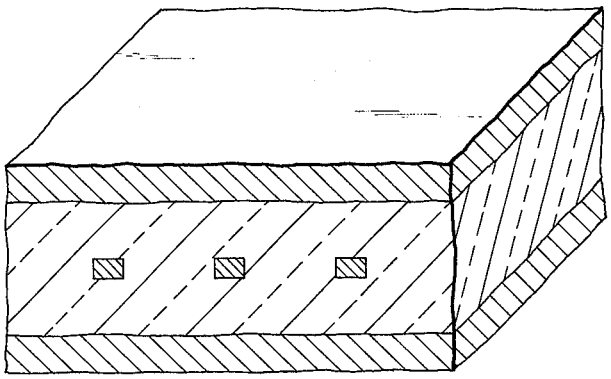
Figure 1B:
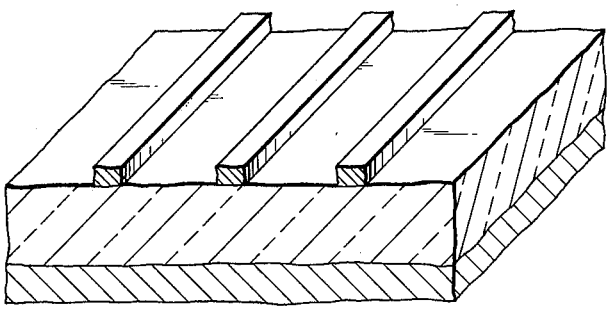
Figure 2:
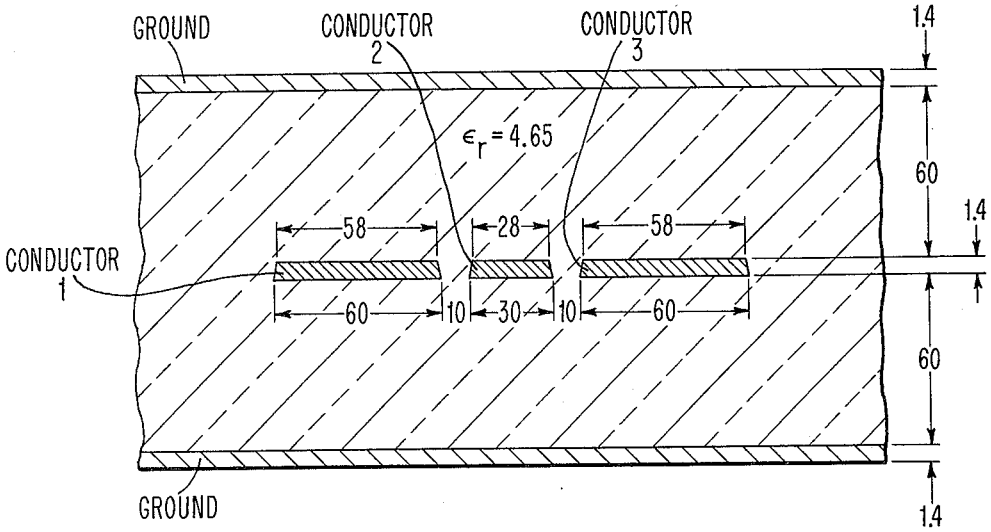
Figure 3:
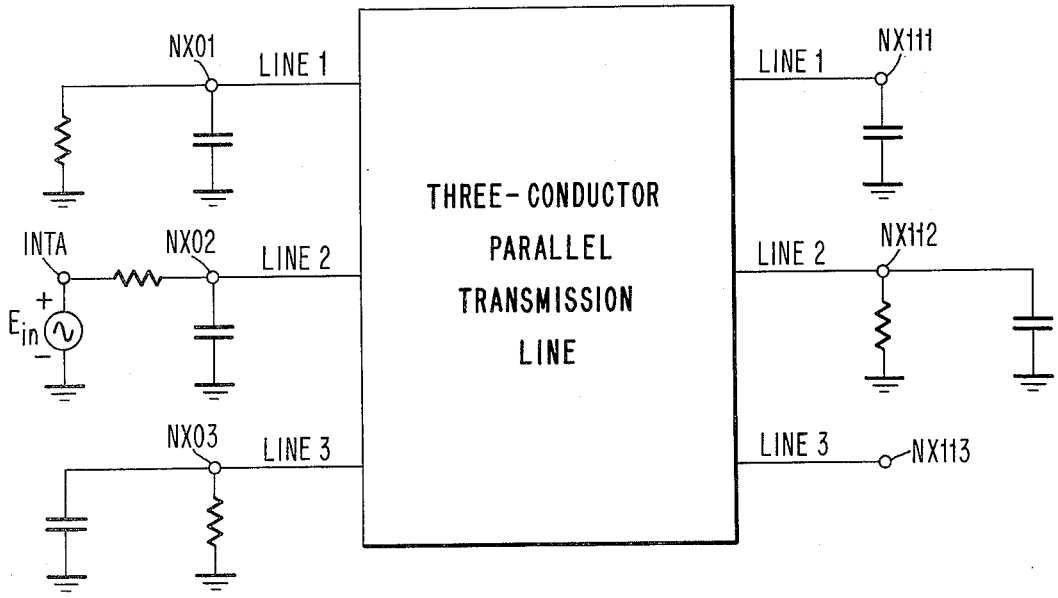
Figure 4:
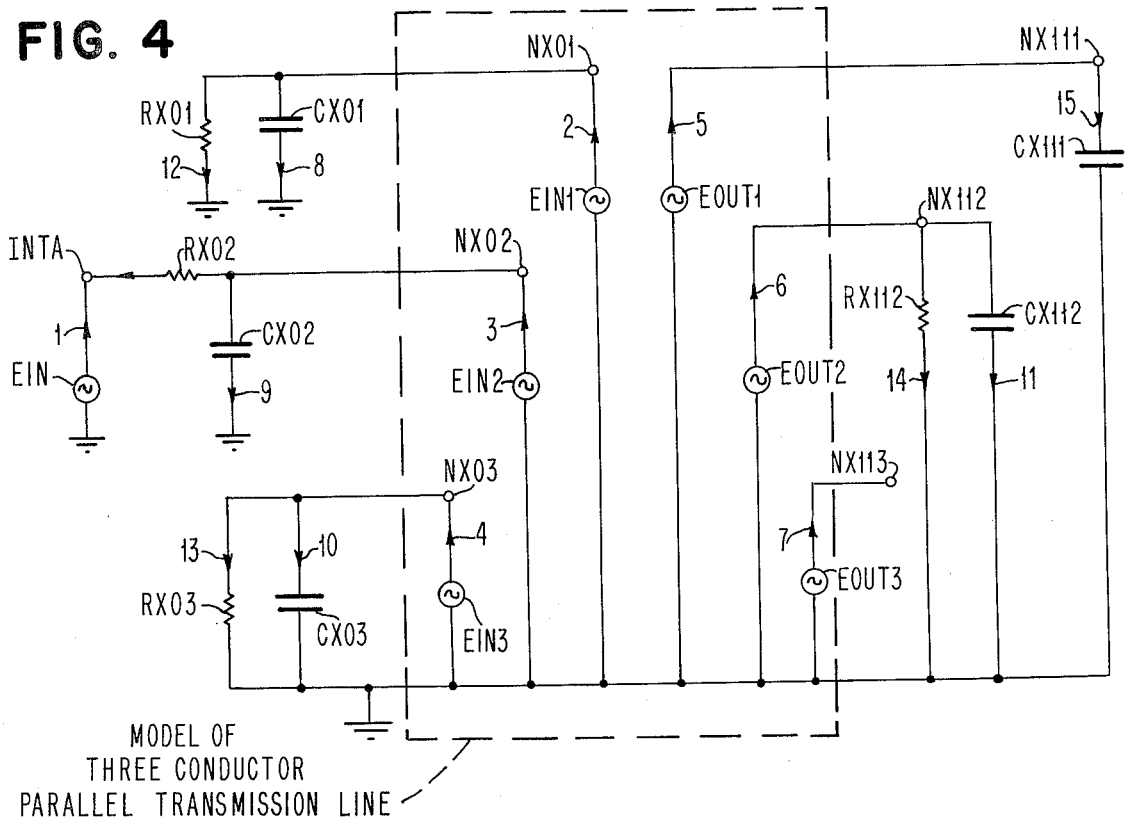
Figure 5:
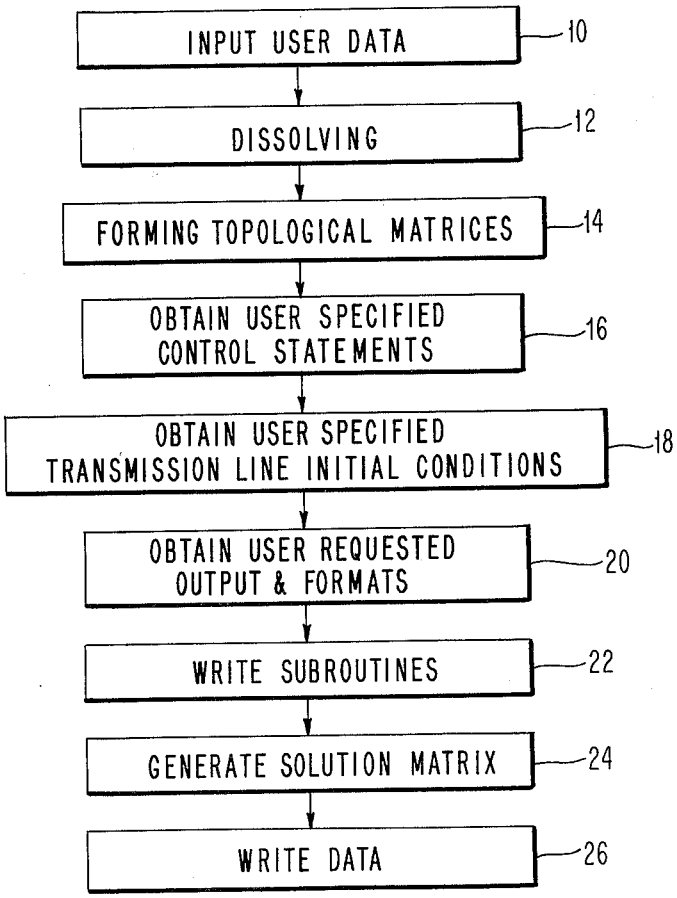
Figure 7:
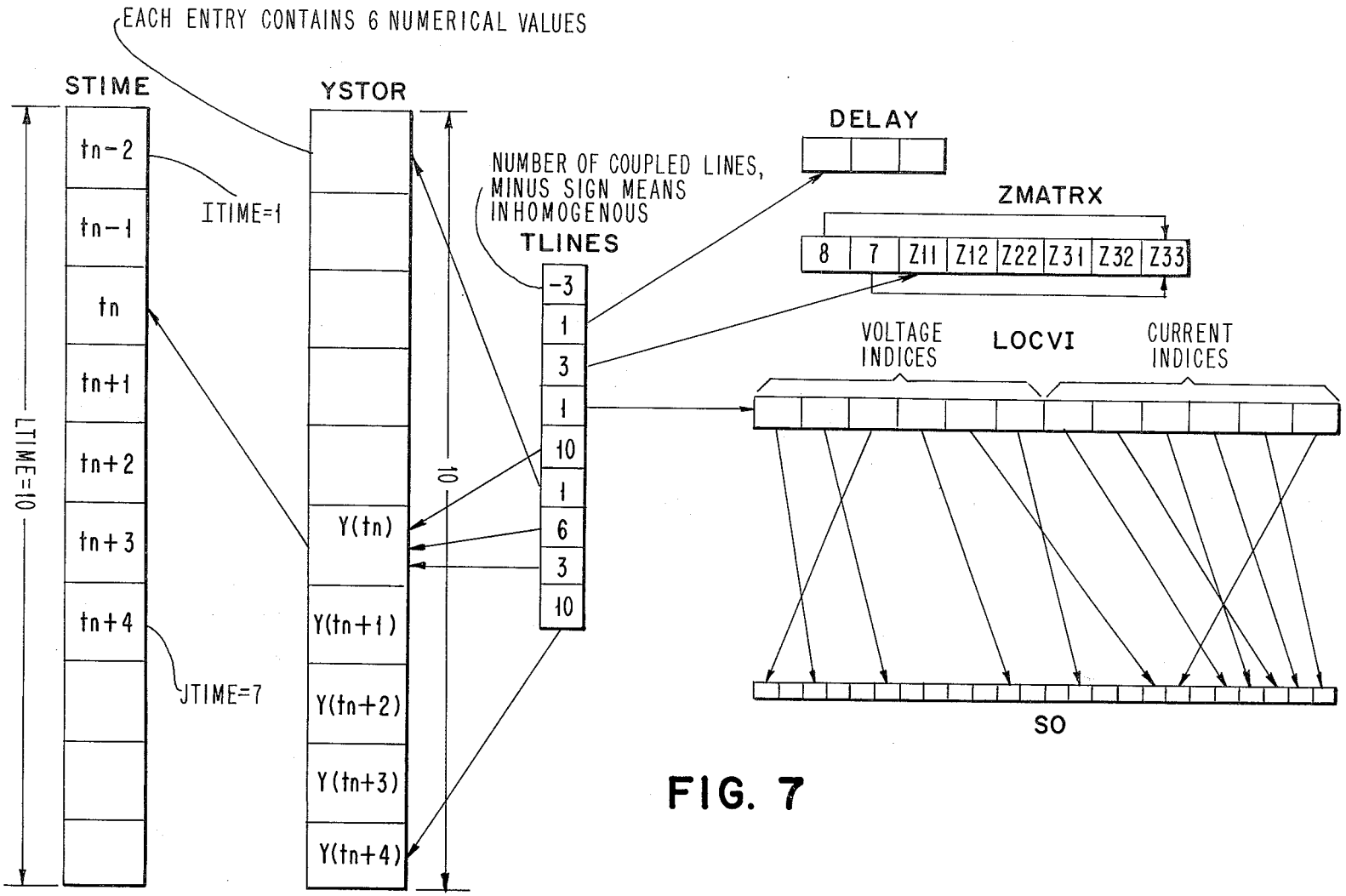
Figure 8:
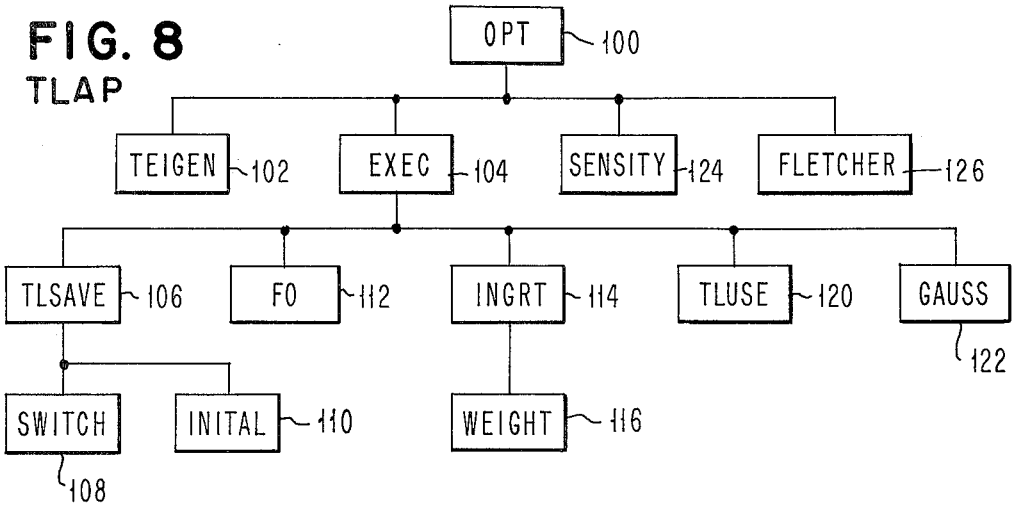
Figure 10:
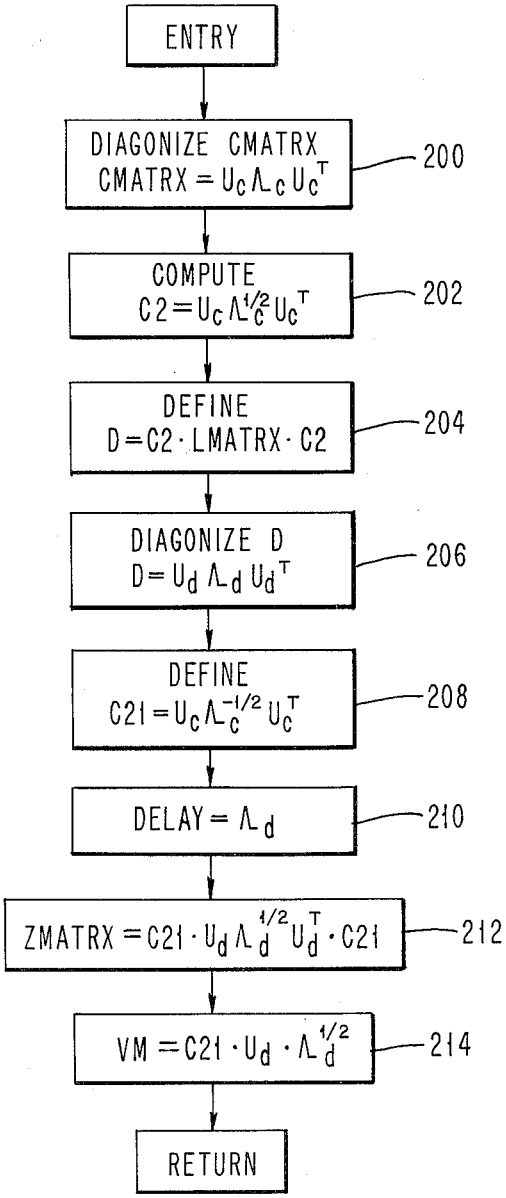
Figure 9:
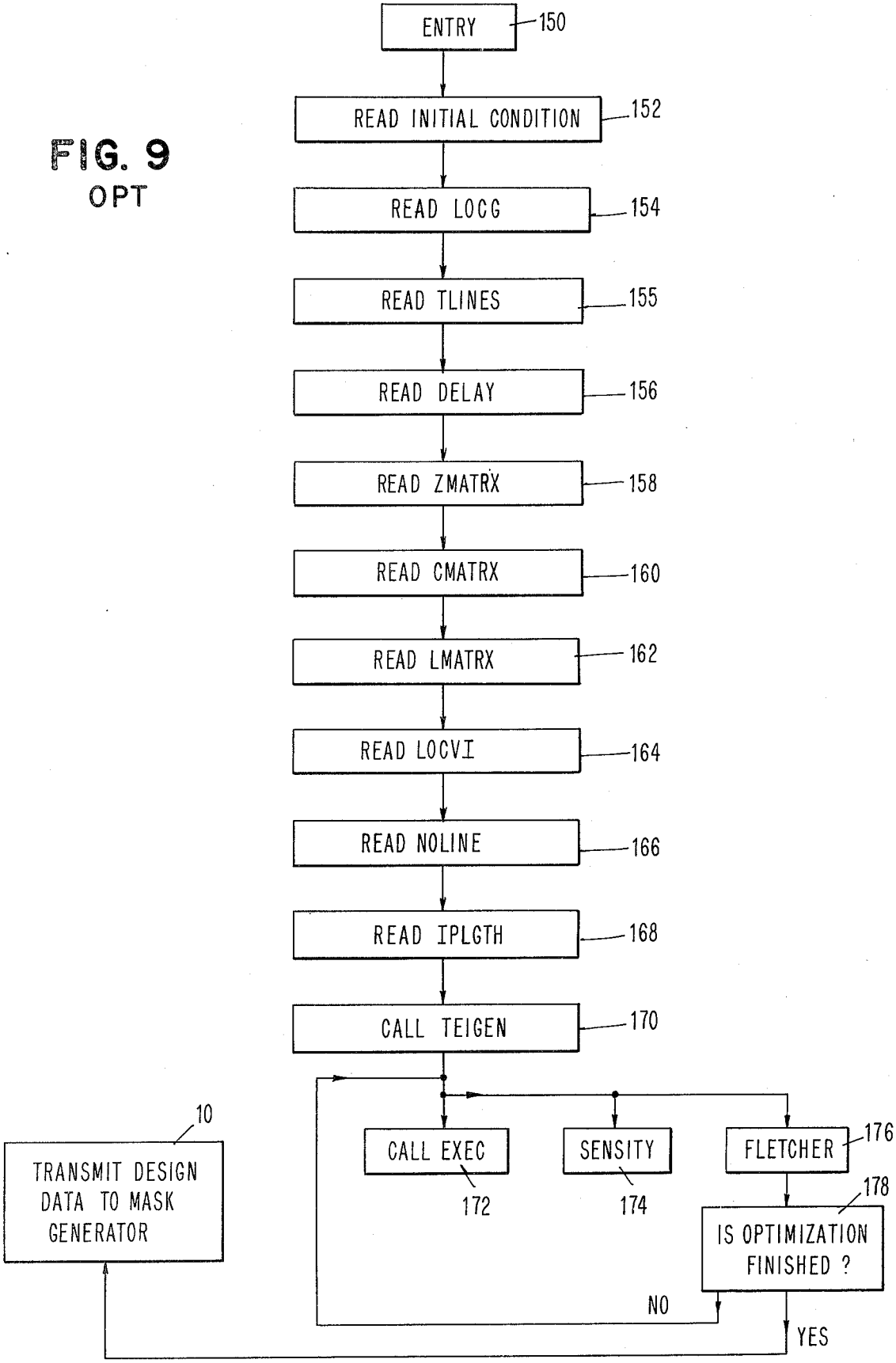
Figure 11:
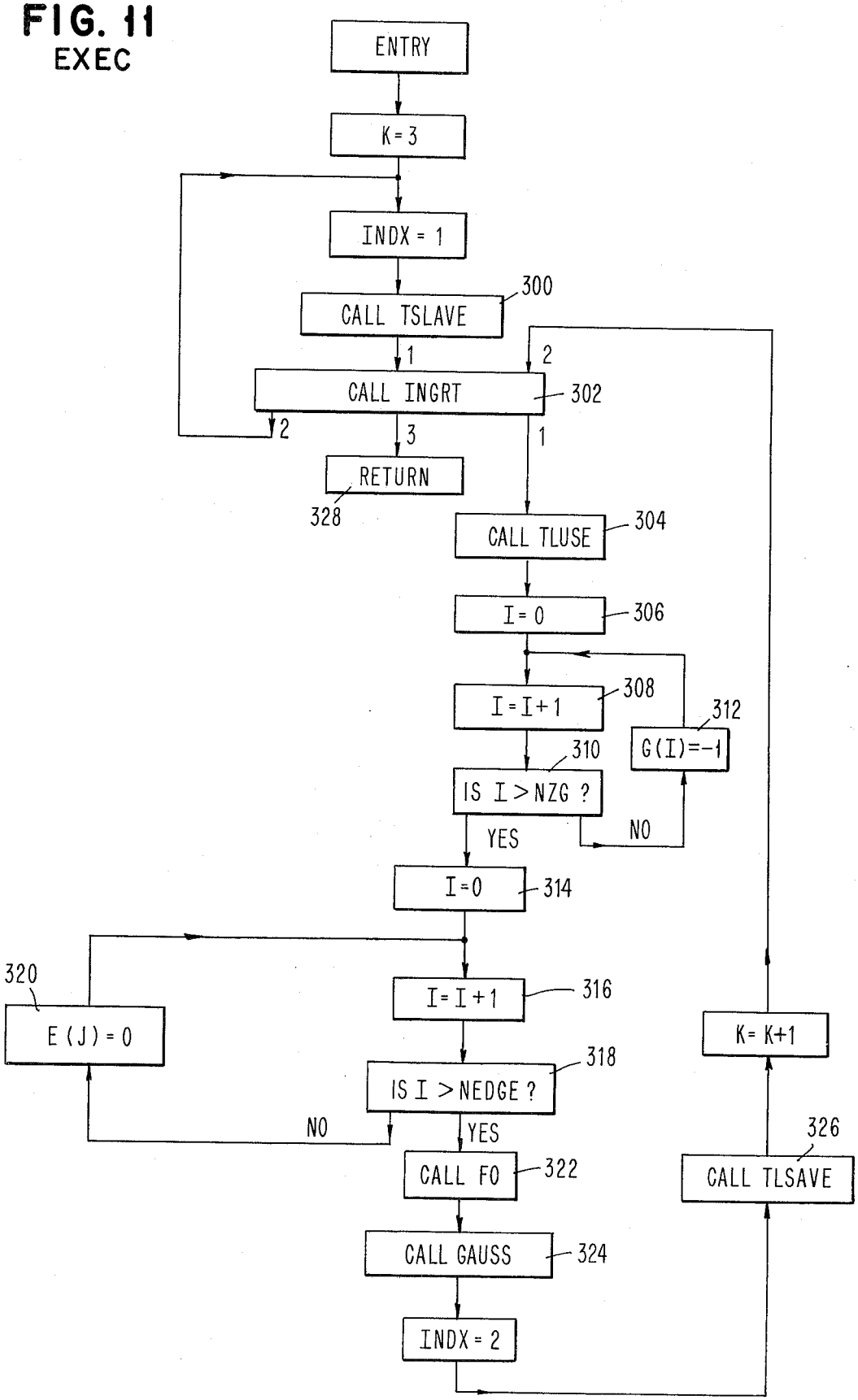
Figure 12:
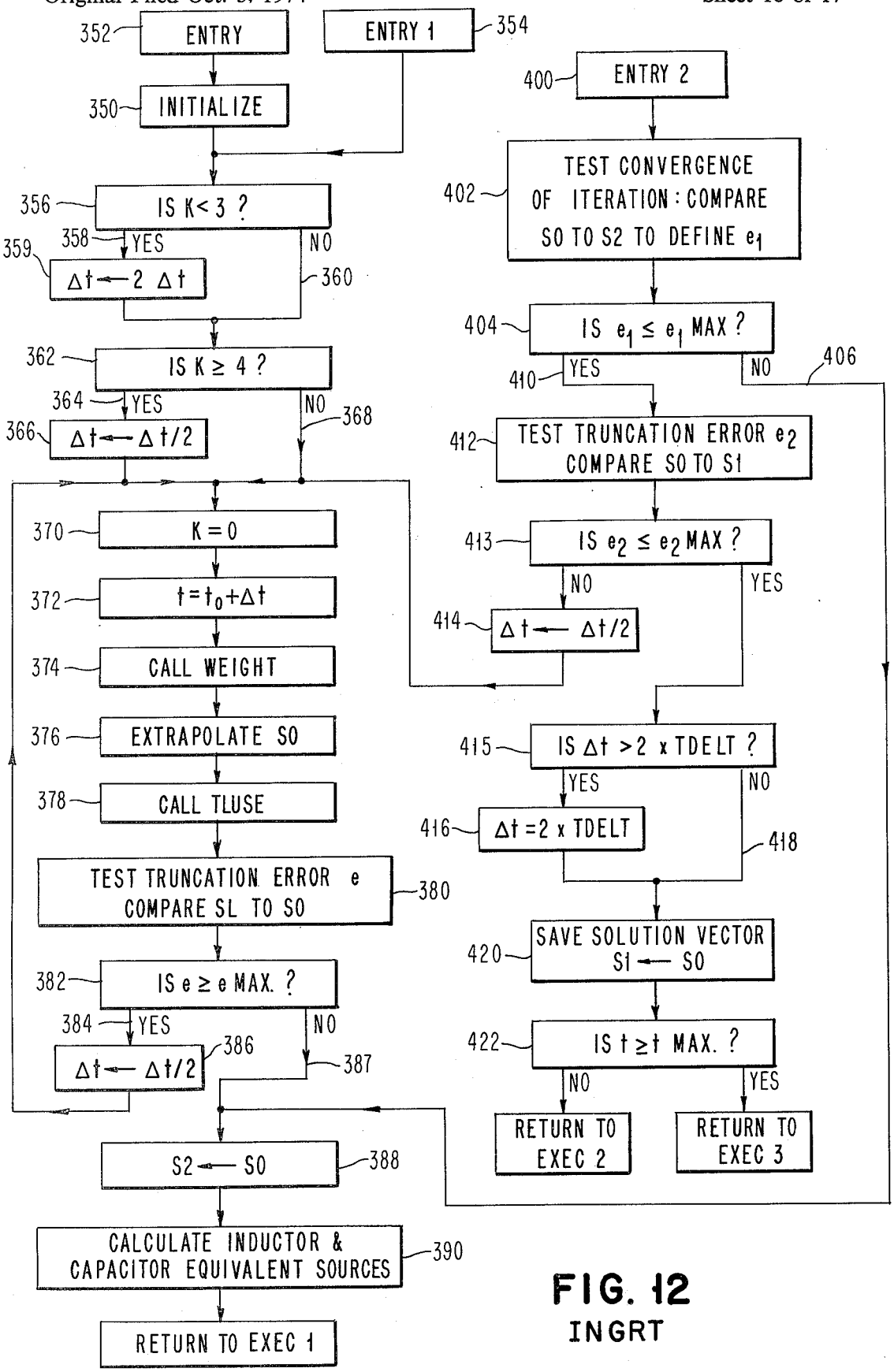
Figures 13, 13A:
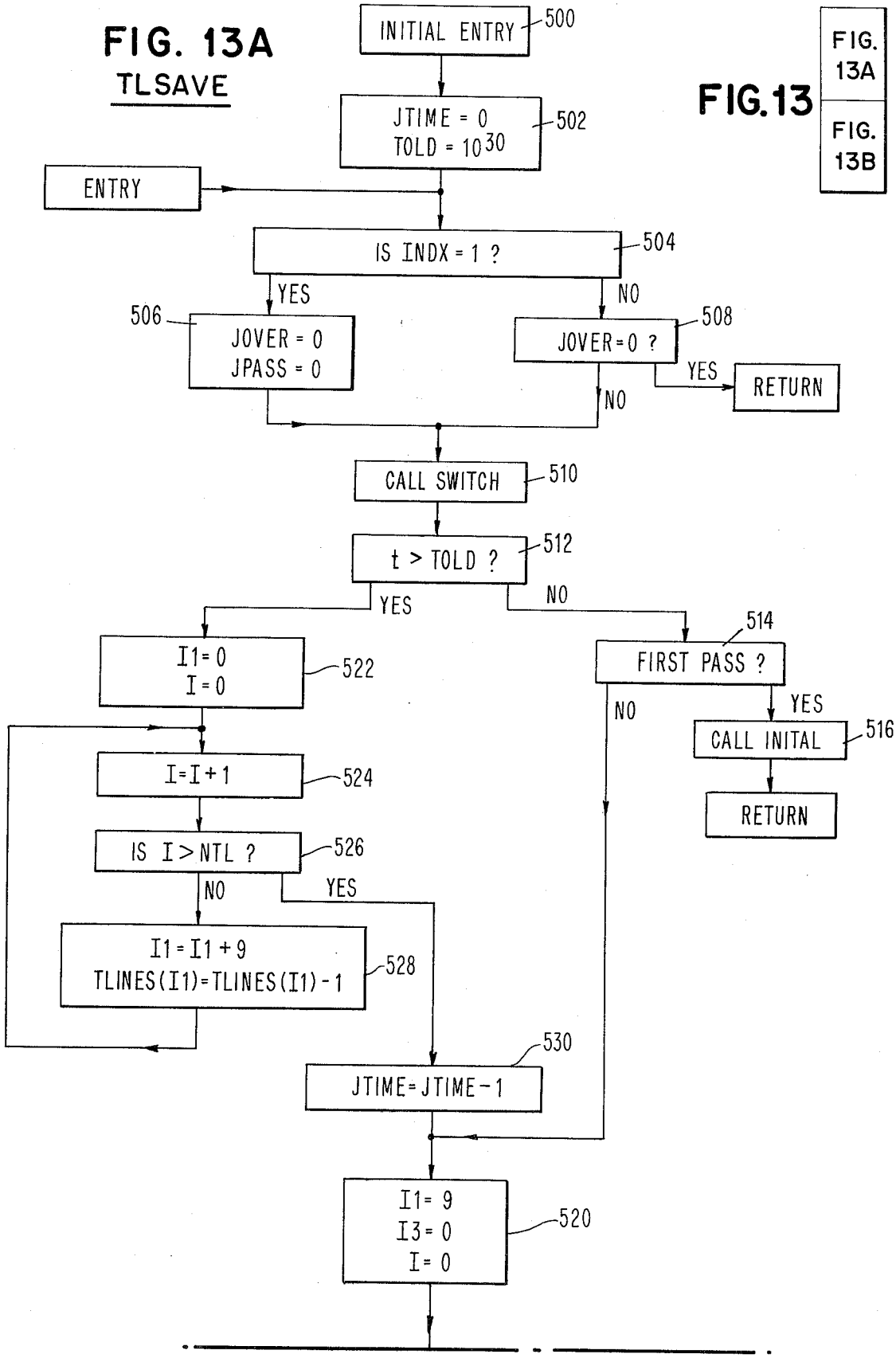
Figure 13B:
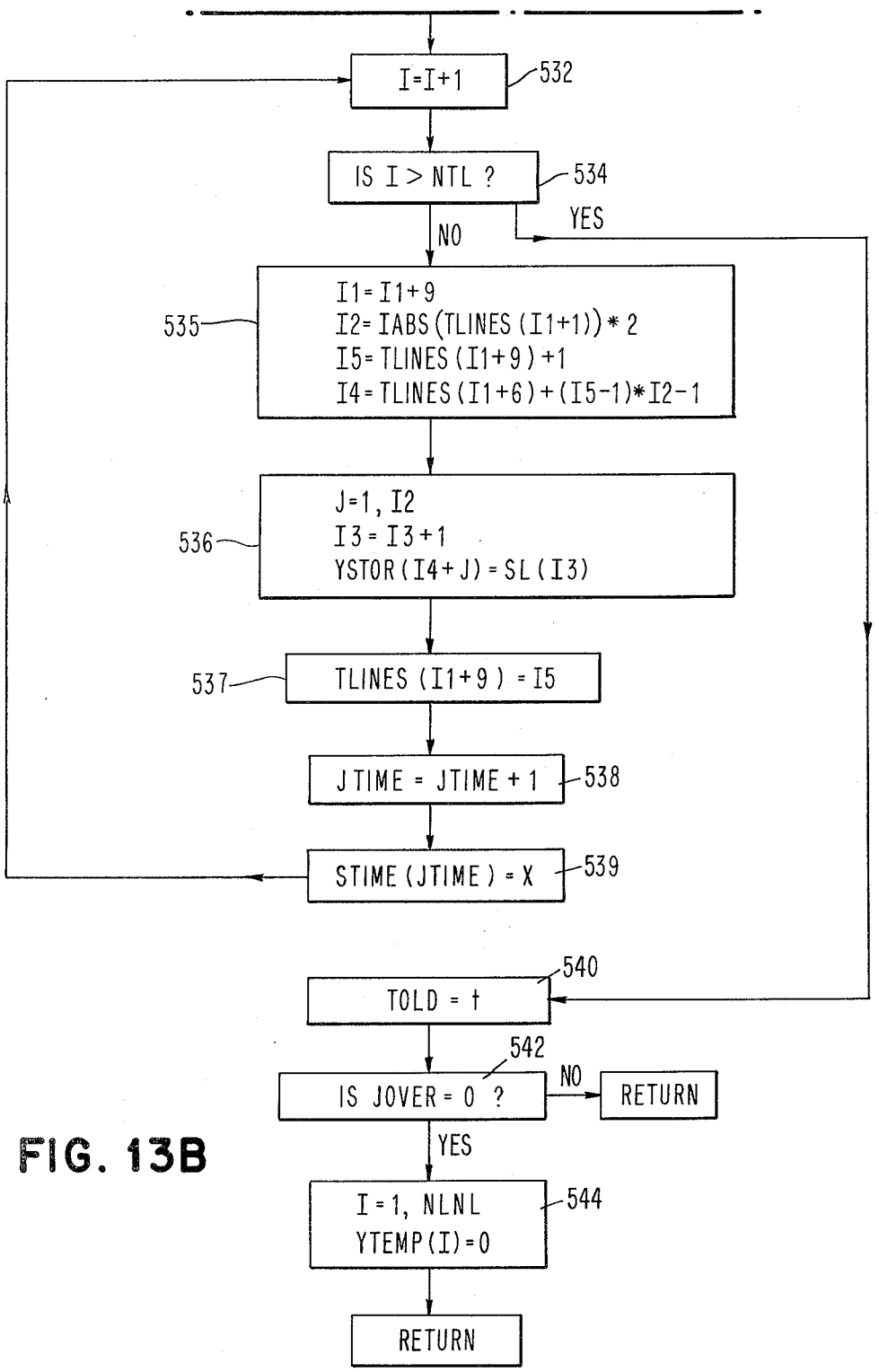
Figure 14:
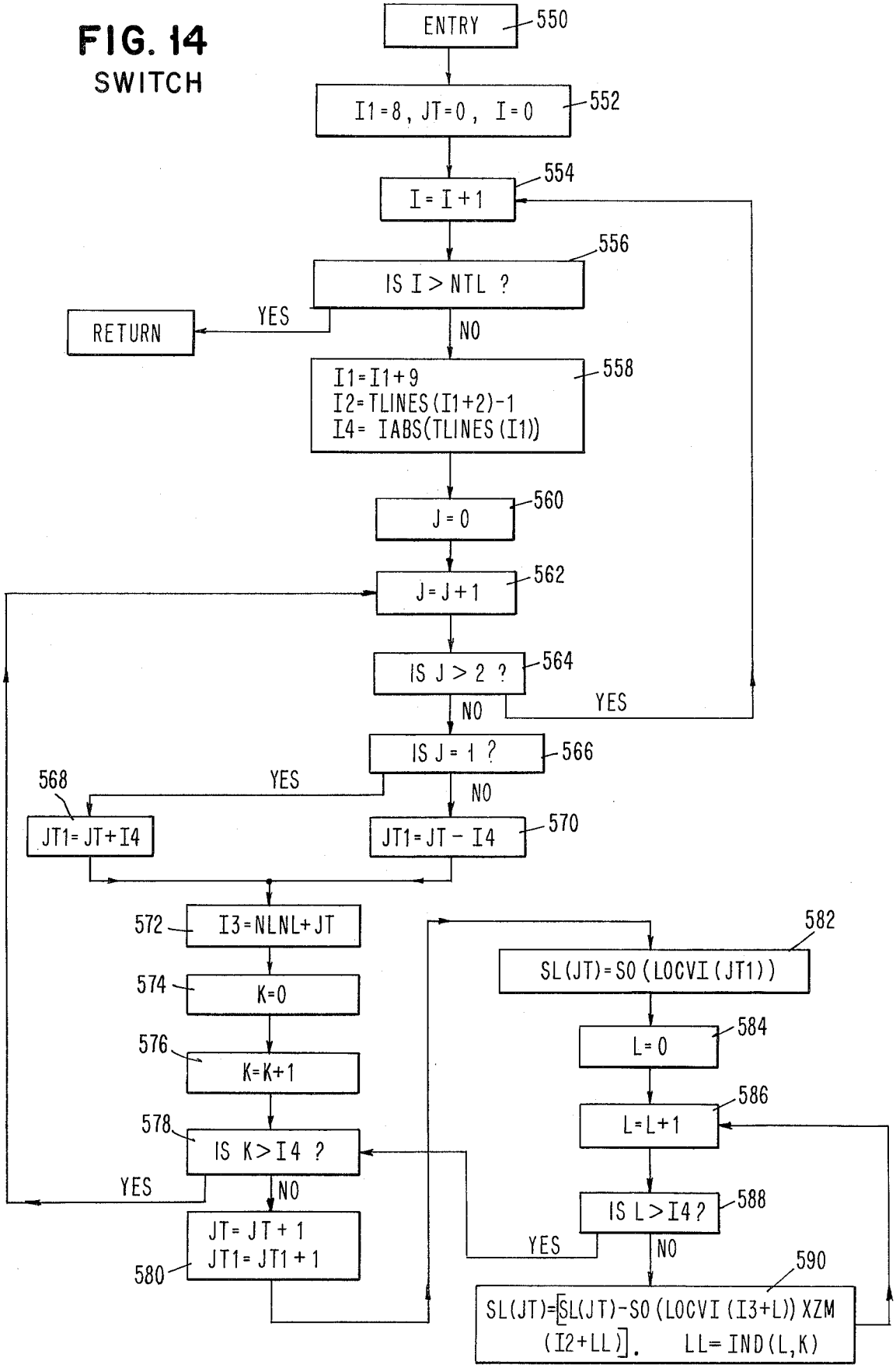
Figure 15:
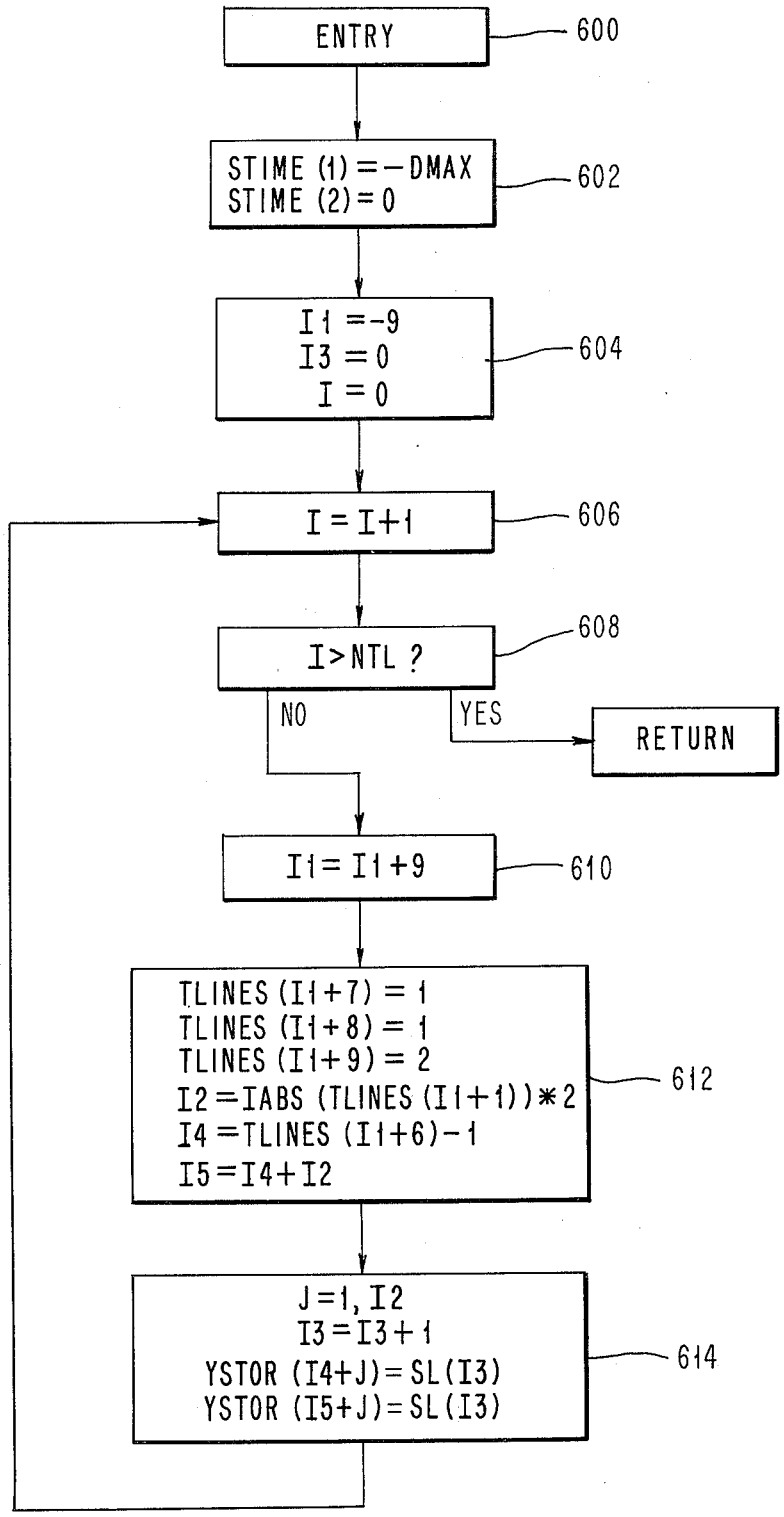
Figure 16:
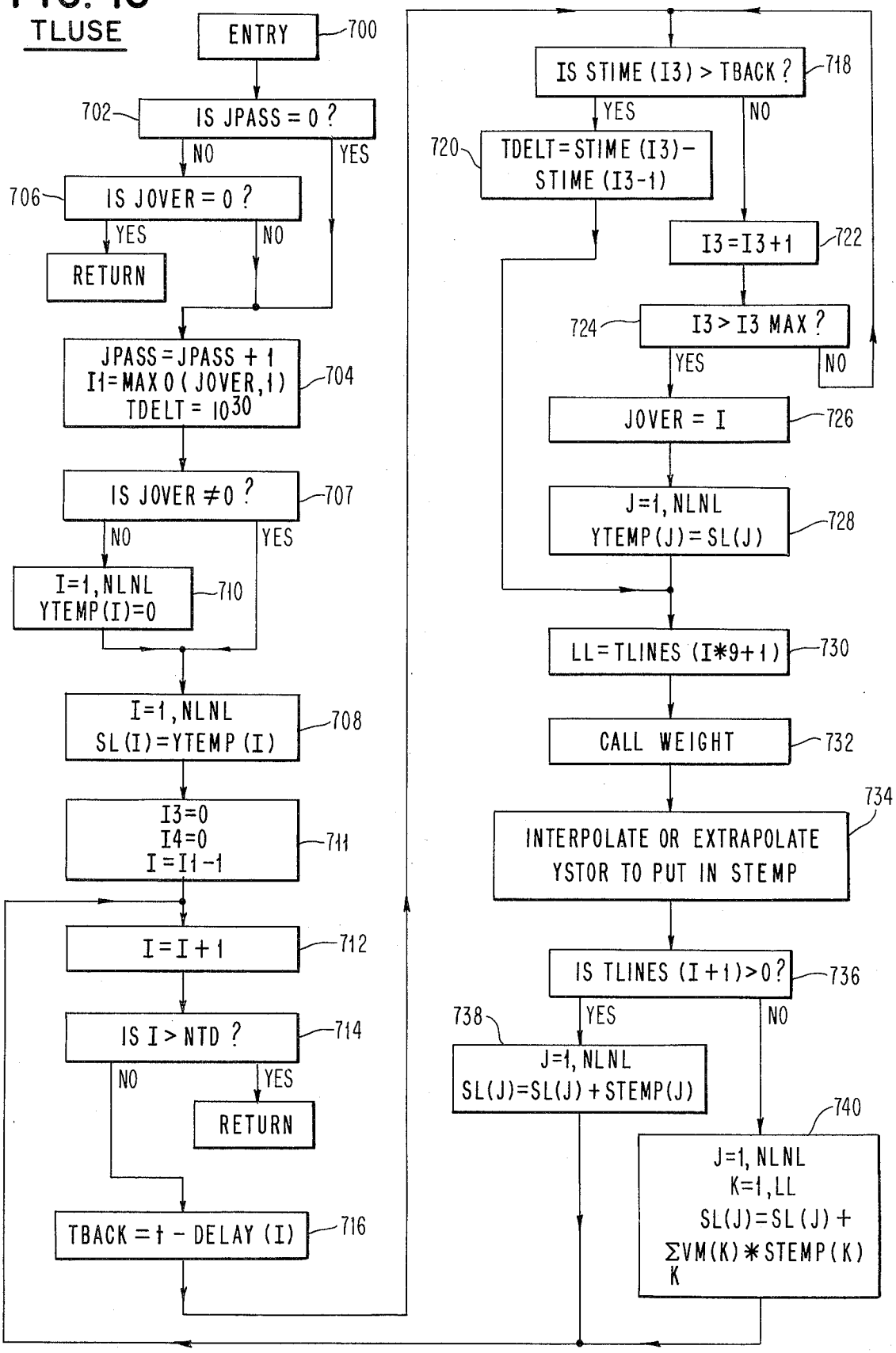
Figure 17:
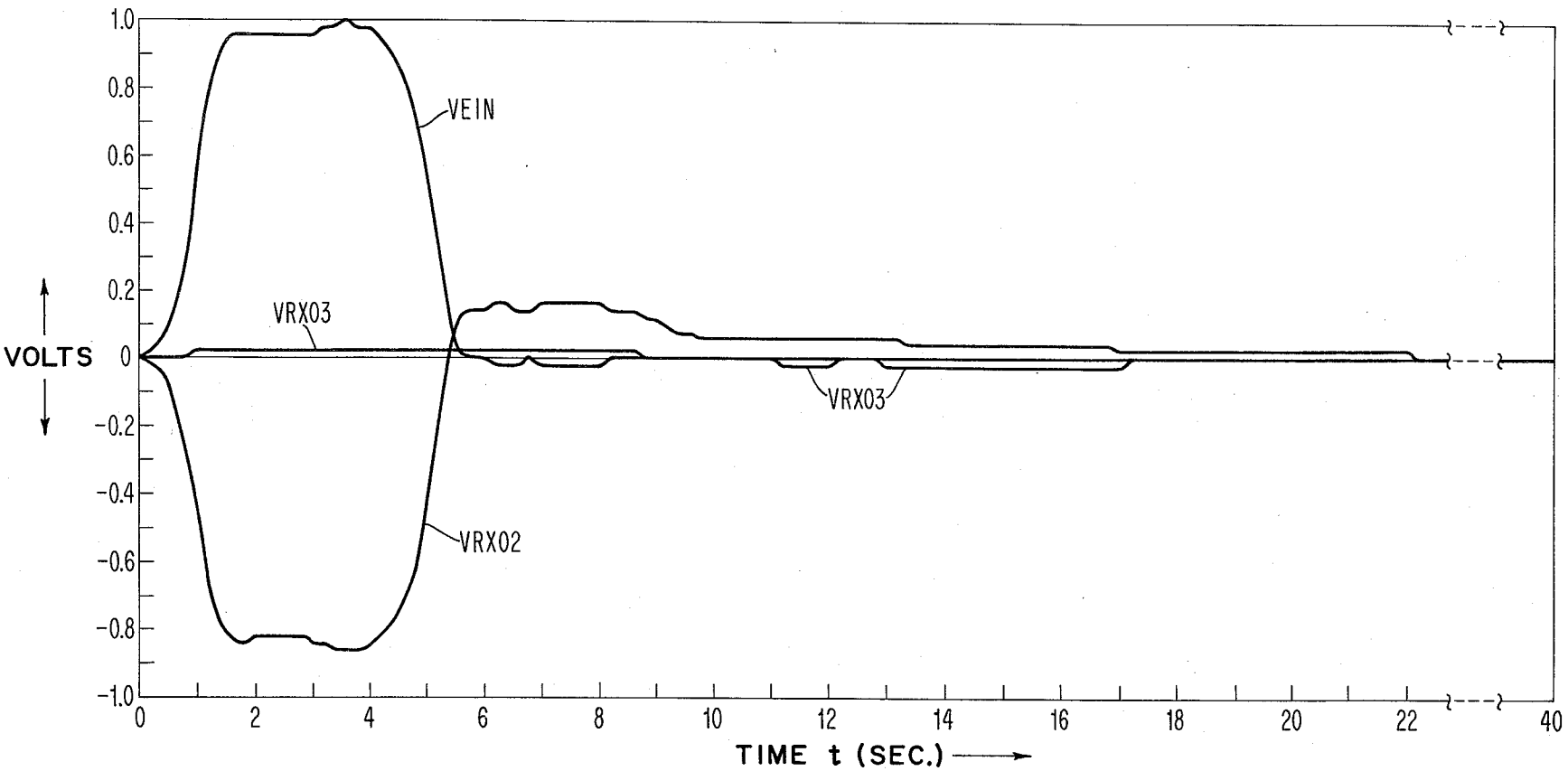
Figure 18:
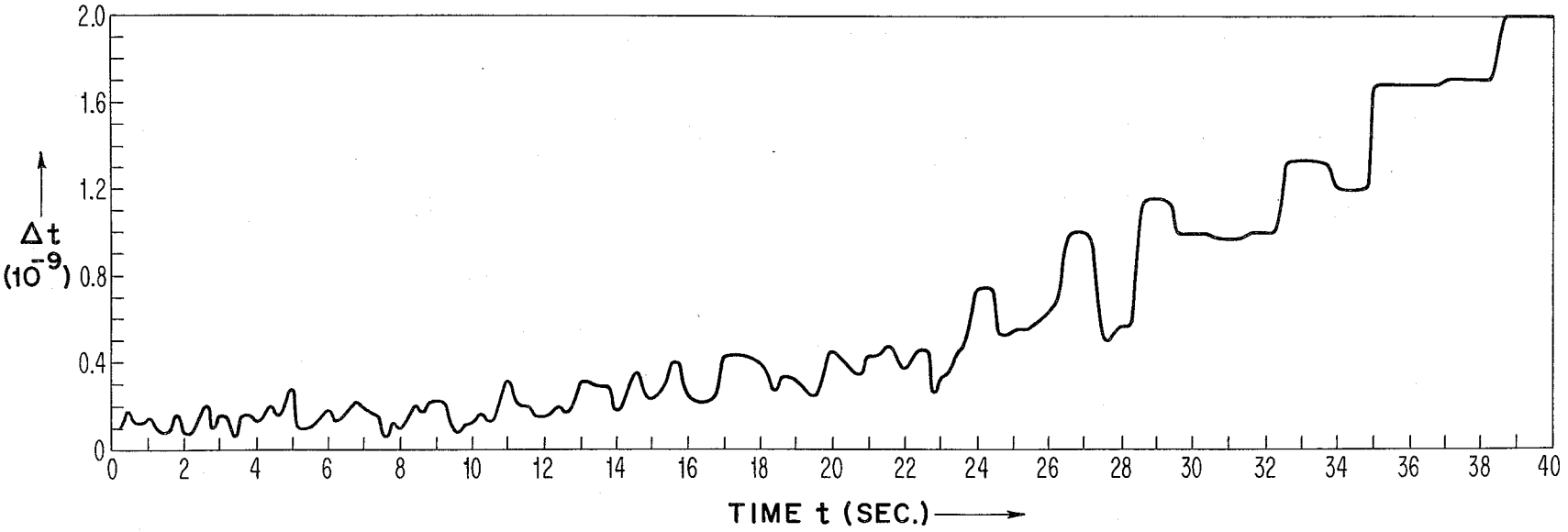

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 9

T940,015

TRANSMISSION LINE ANALYSIS AND DESIGN PROCESS

Chung W. Ho, Mahopac, and Terrence R. Scott, Poughkeepsie, N.Y., assignors to International Business Machines Corporation, Armonk, N.Y.

Continuation of abandoned application Ser. No. 360,244, May 14, 1973. This application Oct. 3, 1974, Ser. No. 511,892

**Int. Cl. G06f *15/06, 15/56***

U.S. Cl. 444—1

17 Sheets Drawing. 52 Pages Specification

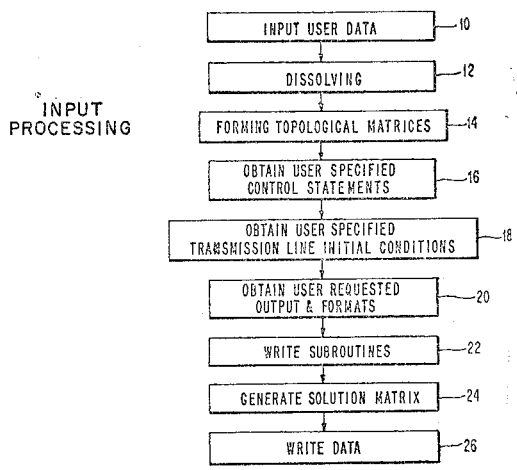

This is a process for analyzing and designing electrical networks containing coupled and uncoupled lossless transmission lines. Such networks are referred to as transmission line networks. The user of the process introduces into a computer system, which is initialized with a program for carrying out the analysis and design process, input information consisting of a symbolic representation of a transmission line network. User input information is first arranged in a data storage means and is then converted into a plurality of arrays, pointers, and tables, as needed by the process to operate on the input information. Then a set of tableau equations which represent the transmission line network are solved in a hierarchial loop structure. Within the iterations executed in the time loops, the time increments are of variable size depending on the rate of convergence in the solution of the equations. In addition, actual input signal values into the transmission lines in the network are utilized in the process of extrapolating or interpolating for the output signal values of those transmission lines at a later time point during a Newtonian iteration. After solving the set of tableau equations, the solution vector is introduced into an optimization process which controls re-execution of the process. Upon optimization being achieved, the resulting solution vector is then used to control the fabrication of a mask generating device for realizing the layout of a network containing transmission line structures for the optimized design.

INPUT PROCESSING

FIG. 6

| FIG. 6A | FIG. 6B |
|---|---|

FIG. 6A

| | IEIN | IEIN1 | IEIN2 | IEIN3 | IEOUT1 | IEOUT2 | IEOUT3 | VCXO1 | VCXO2 | VCXO3 | VCX112 | VRXO1 | VRXO3 | VRX112 | VCX111 | VRXO2 | VEIN | VEIN1 | VEIN2 | VEIN3 | VEOUT1 | VEOUT2 | VEOUT3 |
|---|---|---|---|---|---|---|---|---|---|---|---|---|---|---|---|---|---|---|---|---|---|---|---|
| 1 | 1 | | | | | | | | | | | | | | | | | | | | | | |
| 2 | | 1 | | | | | | | | | | | | | | | | | | | | | |
| 3 | | | 1 | | | | | | | | | | | | | | | | | | | | |
| 4 | | | | 1 | | | | | | | | | | | | | | | | | | | |
| 5 | | | | | 1 | | | | | | | | | | | | | | | | | | |
| 6 | | | | | | 1 | | | | | | | | | | | | | | | | | |
| 7 | | | | | | | 1 | | | | | | | | | | | | | | | | |
| 8 | | | | | | | | 1 | | | | | | | | | | -1 | | | | | |
| 9 | | | | | | | | | 1 | | | | | | | | | | -1 | | | | |
| 10 | | | | | | | | | | 1 | | | | | | | | | | -1 | | | |
| 11 | | | | | | | | | | | 1 | | | | | | | | | | | -1 | |
| 12 | | | | | | | | | | | | 1 | | | | | | -1 | | | | | |
| 13 | | | | | | | | | | | | | 1 | | | | | | | -1 | | | |
| 14 | | | | | | | | | | | | | | 1 | | | | | | | | -1 | |
| 15 | -Z | | | | | | | | | | | | | | 1 | | | | | | -1 | | |
| 16 | | | | | | | | | | | | | | | | 1 | 1 | | -1 | | | | |
| 17 | | | | | | | | | | | | | | | | | -1 | | | | | | |
| 18 | | | | | | | | | | | | | | | | | | -1 | | | | | |
| 19 | | | | | | | | | | | | | | | | | | | -1 | | | | |
| 20 | | | | | | | | | | | | | | | | | | | | -1 | | | |
| 21 | | | | | | | | | | | | | | | | | | | | | -1 | | |
| 22 | | | | | | | | | | | | | | | | | | | | | | -1 | |
| 23 | | | | | | | | | | | | | | | | | | | | | | | -1 |
| 24 | | | | | | | | $C\frac{d}{dt}$ | | | | | | | | | | | | | | | |
| 25 | | | | | | | | | $C\frac{d}{dt}$ | | | | | | | | | | | | | | |
| 26 | | | | | | | | | | $C\frac{d}{dt}$ | | | | | | | | | | | | | |
| 27 | | | | | | | | | | | $C\frac{d}{dt}$ | | | | | | | | | | | | |
| 28 | | | | | | | | | | | | -1 | | | | | | | | | | | |
| 29 | | | | | | | | | | | | | -1 | | | | | | | | | | |
| 30 | | | | | | | | | | | | | | -1 | | | | | | | | | |
| 31 | | | | | | | | | | | | | | | $C\frac{d}{dt}$ | | | | | | | | |
| 32 | | | | | | | | | | | | | | | | -1 | | | | | | | |

$Q^T$

-ZM(1)
-ZM(2)
-ZM(4)
-ZM(3)
-ZM(6)
ZM(5)
-ZM(4)
-Z

FIG. 6B

| | ICX01 | ICX02 | ICX03 | ICX112 | IRX01 | IRX03 | IRX112 | ICX111 | IRX02 | | | | |
|---|---|---|---|---|---|---|---|---|---|---|---|---|---|
| 1 | | | | | | | | | 1 | | SO(1) | | 0 |
| 2 | -1 | | | | -1 | | | | | | SO(2) | | 0 |
| 3 | | -1 | | | | | | | -1 | | SO(3) | | 0 |
| 4 | | | -1 | | | -1 | | | | | ⋮ | | ⋮ |
| 5 | | | | | | | | -1 | | | | | |
| 6 | | | | -1 | | | -1 | | | | | | |
| 7 | | | | | | | | | | | | | |
| 8 | | | | | | | | | | | | | |
| 9 | | | | | | | Q | | | | | | |
| 10 | | | | | | | | | | | | | |
| 11 | | | | | | | | | | | | | |
| 12 | | | | | | | | | | | | | |
| 13 | | | | | | | | | | | | | |
| 14 | | | | | | | | | | | | | |
| 15 | | | | | | | | | | | | | |
| 16 | | | | | | | | | | | | | 0 |
| 17 | | | | | | | | | | × | | = | -TABLE(T(2),TIME) |
| 18 | | | | | | | | | | | | | -SL(1) |
| 19 | | | | | | | | | | | | | -SL(2) |
| 20 | | | | | | | | | | | | | -SL(3) |
| 21 | | | | | | | | | | | | | -SL(4) |
| 22 | | | | | | | | | | | | | -SL(5) |
| 23 | | | | | | | | | | | | | -SL(6) |
| 24 | -1 | | | | | | | | | | | | 0 |
| 25 | | -1 | | | | | | | | | | | 0 |
| 26 | | | -1 | | | | | | | | | | 0 |
| 27 | | | | -1 | | | | | | | | | 0 |
| 28 | | | | | R | | | | | | | | 0 |
| 29 | | | | | | R | | | | | | | 0 |
| 30 | | | | | | | R | | | | | | 0 |
| 31 | | | | | | | | -1 | | | | | 0 |
| 32 | | | | | | | | | R | | SO(32) | | 0 |
| | 24 | 25 | 26 | 27 | 28 | 29 | 30 | 31 | 32 | | | | |

TLAP

TEIGEN

OPT

EXEC

INGRT

TLSAVE

| FIG. 13A |
|---|
| FIG. 13B |

SWITCH

INITAL